(12) United States Patent
Kim et al.

(10) Patent No.: US 12,081,262 B2
(45) Date of Patent: Sep. 3, 2024

(54) PON POWERMETER USING MULTI INPUT TYPE AWG

(71) Applicant: PHOTONICS PLANAR INTEGRATION TECHNOLOGY INC, Gwangju (KR)

(72) Inventors: Wan Chun Kim, Gwangju (KR); Hyung Myung Moon, Gwangju (KR); Jin Goo Pyo, Gwangju (KR); Jin Bong Kim, Gwangju (KR)

(73) Assignee: PHOTONICS PLANAR INTEGRATION TECHNOLOGY INC, Gwangju (KR)

( * ) Notice: Subject to any disclaimer, the term of this patent is extended or adjusted under 35 U.S.C. 154(b) by 0 days.

(21) Appl. No.: 17/898,133

(22) Filed: Aug. 29, 2022

(65) Prior Publication Data

US 2023/0308178 A1    Sep. 28, 2023

(30) Foreign Application Priority Data

Mar. 25, 2022 (KR) .................. 10-2022-0037041
Aug. 9, 2022 (KR) .................. 10-2022-0099020

(51) Int. Cl.
*H04B 10/08* (2006.01)
*H04B 10/079* (2013.01)
*H04B 10/27* (2013.01)

(52) U.S. Cl.
CPC . *H04B 10/07955* (2013.01); *H04B 10/07957* (2013.01); *H04B 10/27* (2013.01)

(58) Field of Classification Search
CPC ........ H04B 10/07955; H04B 10/07957; H04B 10/27; H04B 10/0795; H04B 10/079;

(Continued)

(56) References Cited

U.S. PATENT DOCUMENTS 5,617,234 A * 4/1997 Koga .................. H04B 10/506
                                                          398/95
5,986,782 A * 11/1999 Alexander ....... H04B 10/07955
                                                          398/34

(Continued)

FOREIGN PATENT DOCUMENTS

JP       2000-155228 A     6/2000
KR       10-2040537 B1    11/2019

OTHER PUBLICATIONS

Office Action in corresponding Korean application serial No. 10-2022-0099020 dated Jun. 3, 2024.

*Primary Examiner* — Hanh Phan
(74) *Attorney, Agent, or Firm* — Westman, Champlin & Koehler, P.A.

(57) ABSTRACT

The present disclosure relates to a PON power meter using multi input type AWG, including a first input part into which a first signal is input, wherein the first signal has S optical signals whose wavelengths are different from each other; a second input part into which a second signal is input, wherein the second signal has P optical signals whose wavelengths are different from each other; an AWG that distributes the input signal to M output waveguides according to wavelength band; a detection part configuring (S+P) detection channels by connecting a photodetection element to only (S+P) output waveguides of the M output waveguides of the AWG; and an output part that outputs a strength of the signal detected by the detection part.

18 Claims, 6 Drawing Sheets

(58) Field of Classification Search
CPC .. H04B 10/0793; H04J 14/02; H04J 14/0221; H04J 14/0282; G02B 6/12016; G02B 6/12033
USPC ........ 398/33, 38, 66, 67, 68, 69, 70, 71, 72, 398/79, 82, 85, 87, 158, 159, 59, 25, 26, 398/27; 385/24, 37, 14, 15, 124, 129
See application file for complete search history.

(56) References Cited

U.S. PATENT DOCUMENTS

| | | | |
|---|---|---|---|
| 6,701,042 B1 * | 3/2004 | Kang | G02B 6/12019 |
| | | | 385/24 |
| 7,187,861 B2 | 3/2007 | Ruchet | |
| 10,574,378 B2 * | 2/2020 | Ruchet | H04J 14/0221 |
| 2021/0111796 A1 * | 4/2021 | Smith | H04B 10/0775 |

* cited by examiner

… ... …

PON POWERMETER USING MULTI INPUT TYPE AWG

CROSS-REFERENCE TO RELATED APPLICATION(S)

This application claims priority to Korean application number 10-2022-0037041 filed Mar. 25, 2022 and Korean application number 10-2022-0099020 filed Aug. 9, 2022 which are both incorporated herein by reference in their entireties.

1. Field

The present disclosure relates to a PON power meter, and more particularly, to a PON power meter using multi input type AWG for measuring the power of a multi-wavelength signal.

2. Background

A Passive Optical Network (PON) refers to a system that delivers a signal to an end user through an optical cable network. The PON is made as one Optical Line Terminal (OLT) installed in a telecommunication company is connected to multiple Optical Network Terminals (ONTs) installed near subscribers.

In the PON, only passive elements that do not require a separate power supply are used in the transmission path, and thus the maintenance cost is low, and the transmission bop is long, so it can be utilized in cable TV systems and the like.

A PON power meter is a device that measures the strength of a down-streaming signal transmitted from an OLT to an ONT and an up-streaming signal transmitted from the ONT to the OLT in the PON system as described above.

In the PON, light of various wavelengths is transmitted through one strand of optical fiber in consideration of economic feasibility such as expansion of transmission capacity.

Conventionally, a signal of 1490 nm and 1550 nm wavelength was used for downstream transmission from OLT to ONT, and a signal of 1310 nm wavelength was used for upstream transmission from ONT to OLT, and in U.S. Pat. No. 7,187,861 and the like, in order to measure signals of 1490 nm, 1550 nm, and 1310 nm wavelengths with one PON power meter, three filters were used to filter each signal.

However, recently, the signal used for downstream transmission from OLT to ONT has been expanded to 1490 nm, 1550 nm, and 1580 nm (or 1577 nm or 1578 nm) wavelength signals, and the signal used for upstream transmission from ONT to OLT has been expanded to 1270 nm, 1310 nm, and 1610 nm wavelength signals.

Thus, when filters for filtering a multi-wavelength signal into a signal of each wavelength are provided in one PON power meter as in prior art, problems such as the increase of device size, deterioration of portability, and difficulty of maintenance occur.

SUMMARY

A purpose of the present disclosure is to provide a PON power meter using multi input type AWG.

Another purpose of the present disclosure is to provide a PON power meter using multi input type AWG that measures multi-wavelength signals using one AWG.

Another purpose of the present disclosure is to provide a PON power meter using multi input type AWG that measures multi-wavelength signals using one 2×1 coupler and one 1×M AWG.

Another purpose of the present disclosure is to provide a PON power meter using multi input type AWG that measures mufti-wavelength signals using one N×M AWG without 2×1 coupler.

Another purpose of the present disclosure is to provide a PON power meter using multi input type AWG with minimized components for measuring multi-wavelength signals thereby improving portability.

The abovementioned purposes and other purposes of the present disclosure will all be achieved by a PON power meter using multi input type AWG according to the present disclosure.

A PON power meter using multi input type AWG according to an embodiment of the present disclosure includes a first input part into which a first signal is input, wherein the first signal has S optical signals whose wavelengths are different from each other; a second input part into which a second signal is input, wherein the second signal has P optical signals whose wavelengths are different from each other; a coupler that receives the first signal and the second signal from the first input part and the second input part and outputs the received first signal and second signal through one output line; an AWG that distributes the signal output from the output line of the coupler to M output waveguides according to wavelength band; a detection part configuring (S+P) detection channels by connecting a photodetection element to only (S+P) output waveguides of the M output waveguides of the AWG, wherein each of the (S+P) output waveguides outputs an optical signal whose wavelength corresponds to one of the wavelengths of the S optical signals and the P optical signals; and an output part that outputs a strength of the signal detected by the detection part, wherein the AWG is 1×M AWG, the S and P are integers, (S+P) is an integer that is greater than or equal to 3, M is an integer that is greater than or equal to (S+P), and the S optical signals and the P optical signals are output to different output waveguides in the AWG.

Further, the first input part, the second input part, the coupler, and the AWG may be formed in one PLC chip. Here, in the PLC chip, an optical path may be formed, that inputs a portion of an optical signal transmitted from one side to the other side of an optical cable into the AWG through the coupler, and outputs the rest to the other side of the optical cable, and inputs a portion of the optical signal transmitted from the other side to one side of the optical cable to the AWG through the coupler, and outputs the rest to one side of the optical cable.

Further, a PON power meter using multi input type AWG according to an embodiment of the present disclosure includes a first input part into which a first signal is input, wherein the first signal has S optical signals whose wavelengths are different from each other; a second input part into which a second signal is input, wherein the second signal has P optical signals whose wavelengths are different from each other; an AWG connected to the first input part and the second input part such that a signal from the first input part and a signal from the second input part are input into different input waveguides, respectively, and that distributes the input signal to M output waveguides according to wavelength band; a detection part configuring (S+P) detection channels by connecting a photodetection element to only (S+P) output waveguides of the M output waveguides of the AWG, wherein each of the (S+P) output waveguides outputs an optical signal whose wavelength corresponds to the wavelength of the S optical signals and the P optical signals; and an output part that outputs a strength of the signal detected by the detection part, wherein the AWG is N×M AWG, the S and P are integers, (S+P) is an integer that is greater than or equal to 3, N is an integer that is greater than or equal to 2, M is an integer that is greater than or equal to (S+P), and the S optical signals and the P optical signals are output to different output waveguides in the AWG.

The first input part, the second input part, and the AWG may be formed in one PLC chip. Here in the PLC chip, an optical path may be formed, that inputs a portion of an optical signal transmitted from one side to the other side of an optical cable into the AWG, and outputs the rest to the other side of the optical cable, and inputs a portion of the optical signal transmitted from the other side to one side of the optical cable to the AWG, and outputs the rest to one side of the optical cable.

The output part may determine whether the signal detected from the detection part is the first signal or the second signal and a wave length of the detected signal according to which channel of (S+P) detection channels the detected signal is detected.

The first input part and the second input part may input only a portion of the signal transmitted through an optical cable into the power meter.

A wavelength difference between the optical signals output through the output waveguides neighboring each other of the AWG may be $\Delta\lambda + \alpha$, and $0 \le \alpha \le \Delta\lambda/3$.

$\Delta\lambda$ may be equal to or smaller than a minimum wavelength difference between optical signals configuring the first signal and the second signal.

The wavelength difference between the optical signals configuring the first signal and the second signal may be $L \times \alpha\lambda + \alpha$, and L may be a natural number, and $0 \le \alpha \le \Delta\lambda/3$.

The first signal may be a signal where an optical signal of 1270 nm, 1310 nm, and 1610 nm wavelengths are mixed, and the second signal is a signal where an optical signal of 1490 nm, 1550 nm, and 1577 to 1580 nm wavelengths are mixed, the AWG may be 1×12 AWG, and the detection part may connect a photodetection element to only 6 of the output waveguides of the AWG to configure 6 detection channels.

The first signal may be a signal where an optical signal of 1270 nm, 1310 nm, and 1610 nm wavelengths are mixed, and the second signal may be an optical signal where an optical signal of 1490 nm, 1550 nm, and 1577 to 1580 nm wavelengths are mixed, the N may be 2 to 6, and M may be 12, and the detection part may connect a photodetection element to only 6 of the output waveguides of the AWG to configure 6 detection channels.

A PON power meter using multi input type AWG according to the present disclosure has an effect of measuring the strength of each wavelength signal included in a multi-wavelength signal using one AWG.

Further, the present disclosure has an effect of providing a PON power meter using multi input type AWG where only one AWG is used when measuring a multi-wavelength signal thereby minimizing components and improving portability.

Further, the present disclosure has an effect of providing a PON power meter using multi input type AWG where an input part and AWG are formed in one PLC, thereby simplifying the components and improving the productivity.

In addition, the present disclosure has an effect of providing a PON power meter using multi input type AWG that is capable of simultaneous measurement and real time monitoring of two-way communication signals.

The present summary is provided only by way of example and not limitation. Other aspects of the present invention will be appreciated in view of the entirety of the present disclosure, including the entire text, claims and accompanying figures.

Figure 1:
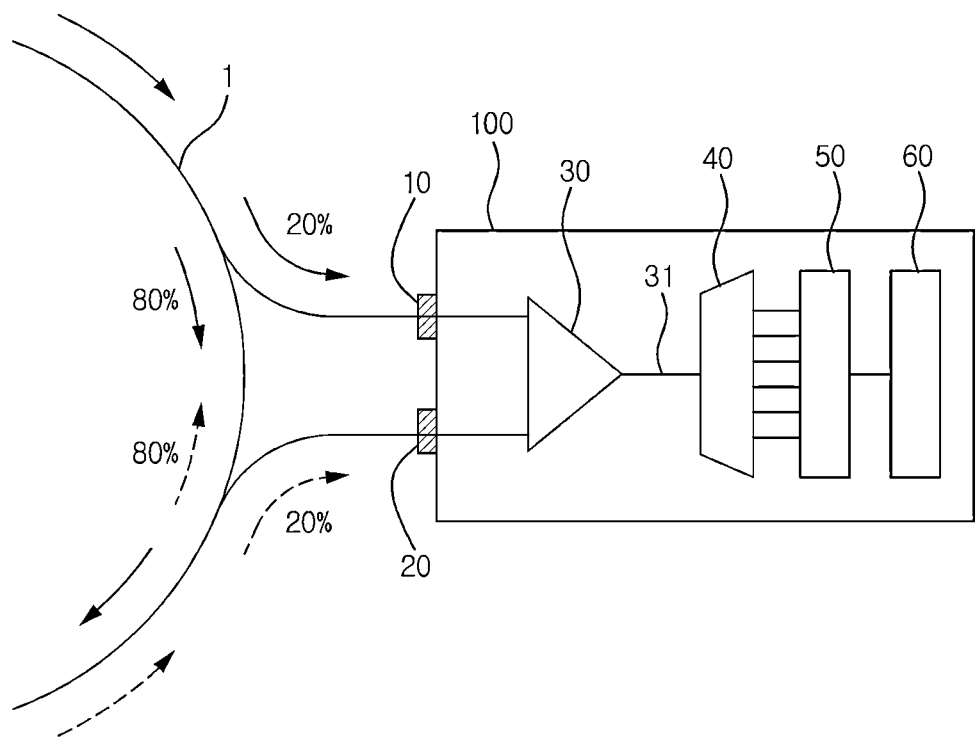
FIG. 1 is schematic view of a PON power meter using multi input type AWG according to an embodiment of the present disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION

Hereinbelow, a PON power meter using multi input type AWG according to an embodiment of the present disclosure will be described in detail with reference to the drawings attached.

In the description below, only those necessary for understanding a PON power meter using multi input type AWG according to an embodiment of the present disclosure will be described, and description of other parts may be omitted so as not to obscure the gist of the present disclosure.

Further, the terms or words used in the present specification and claims described below should not be construed as being limited to conventional or dictionary meanings, but should be construed as meanings and concepts consistent with the technical spirit of the present disclosure so that the present disclosure can be most appropriately expressed.

Throughout the specification, when it is stated that a part "includes/comprises" a certain component, it means that other components may be further included, rather than excluding other components, unless otherwise stated.

In various embodiments, components having the same configuration will be typically described in one embodiment using the same reference numerals, and configurations different from the one embodiment will be described in other embodiments.

FIG. 1 illustrates a schematic view of a PON power meter using multi input type AWG according to an embodiment of the present disclosure 100.

The PON power meter using multi input type AWG according to an embodiment of the present disclosure 100 includes a first input part 10, a second input part 20, a coupler 30, an AWG 40, a detection part 50, and an output part 60.

First of all, a portion of an optical signal being transmitted from an optical cable 1 is input into the PON power meter using multi input type AWG according to an embodiment of the present disclosure 100 through the first input part 10 and the second input part 20.

Specifically, a first signal, that is a portion of the signal being transmitted from one side to the other side of the optical cable 1, may be input through the first input part 10.

In addition, a second signal, that is a portion of a signal being transmitted from the other side to the one side of the optical cable 1, may be input through the second input part 20.

The first signal and the second signal are portions (for example 20%) branched from signals being transmitted through the optical cable 1, and may be multi wavelength signals where 2 or more wavelength signals are mixed.

For example, in the Passive Optical Network (PON), the first signal may be a portion of an upstream signal where 1270 nm, 1310 nm, and 1610 nm wavelength signals are mixed, and the second signal may be a portion of a downstream signal where 1490 nm, 1550 nm, and 1580 nm (or 1577 nm or 1578 nm) wavelength signals are mixed.

Therefore, communication through the optical cable can be continued without interruption even while measuring the signal after connecting the PON power meter using the multi-input AWG according to an embodiment of the present invention to the optical cable.

In order for a portion of the signal being transmitted through the optical cable 1 to be branched and input into the PON power meter using multi input type AWG according to an embodiment of the present disclosure 100, the first input part 10 and the second input part 20 may be connected to an optical splitter, or the first input part and the second input part may have the functions of an optical splitter.

The coupler 30 outputs the first signal and the second signal input through the first input part 10 and the second input part 20 through one output line 31.

Figure 2:
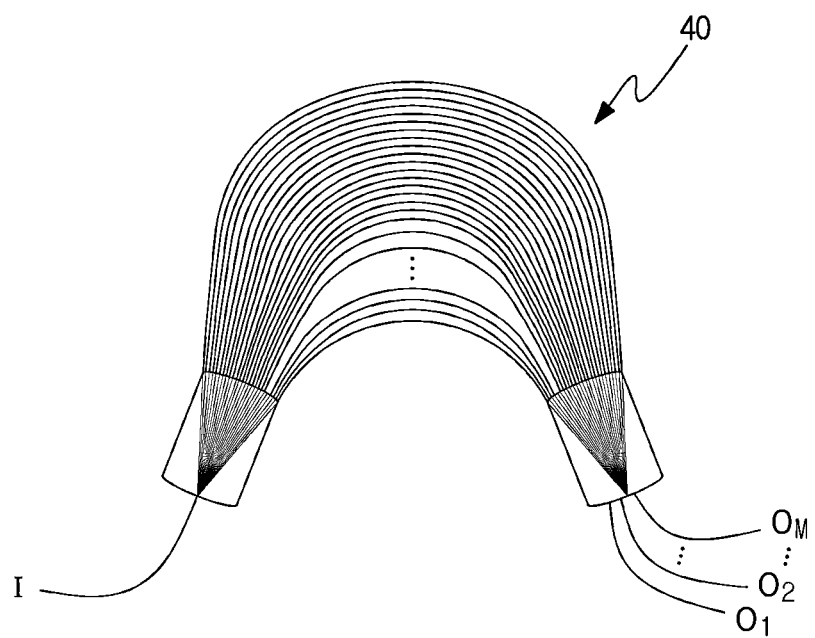
FIG. 2 is a view showing 1×M AWG used in the PON power meter using multi input type AWG according to an embodiment of the present disclosure.

As shown in FIG. 2, the AWG 40 is a 1×M Arrayed Waveguide Grating that divides the optical signal input into one input waveguide (I) according to wavelengths and outputs into M output waveguides $O_1, O_2, \ldots, O_M$ (M is an integer greater than or equal to 2).

In the AWG 40, due to the difference of lengths between the array waveguides neighboring each other, an optical signal is output having a certain wavelength interval by M output waveguides.

In the PON power meter using multi input type AWG according to an embodiment of the present disclosure 100, in order to divide the first signal and the second signal, where a plurality of wavelength signals are mixed, into individual wavelength signals through one AWG, the AWG is configured as follows.

First of all, the first signal has S optical signals whose wavelengths are different from each other. The second signal has P optical signals whose wavelengths are different from each other. In order to divide the first signal and the second signal according to wavelengths, the AWG is configured to have output waveguides greater than or equal to (S+P).

When the difference of wavelengths between the optical signals configuring the first signal and the second signal is $L \times \Delta\lambda + \alpha$ (L is an integer, $0 \leq \alpha \leq \Delta\lambda/3$), it is desirable that the difference of wavelengths between the optical signals being output to output waveguides neighboring each other is $\Delta\lambda + \alpha$ and $0 \leq \alpha \leq \Delta\lambda/3$.

$\Delta\lambda$ may be equal to or smaller than the minimum wavelength difference between the optical signals configuring the first signal and the second signal.

Therefore, when the first signal is a signal where optical signals of 1270 nm, 1310 nm, and 1610 nm wavelengths are mixed, and the second signal is a signal where optical signals of 1490 nm, 1550 nm, and 1580 nm (or 1577 nm or 1578 nm) wavelengths are mixed, the AWG 40 may desirably be configured to have 12 output waveguides as shown below.

TABLE 1

| Output waveguides | Center wavelength of output optical signal |
| --- | --- |
| OUT No. 1 | 1270 nm |
| OUT No. 2 | 1310 nm |
| OUT No. 3 | 1340 nm |
| OUT No. 4 | 1370 nm |
| OUT No. 5 | 1400 nm |
| OUT No. 6 | 1430 nm |
| OUT No. 7 | 1460 nm |
| OUT No. 8 | 1490 nm |
| OUT No. 9 | 1520 nm |
| OUT No. 10 | 1550 nm |
| OUT No. 11 | 1580 nm |
| OUT No. 12 | 1610 nm |

The detection part 50 includes a plurality of optical photodetection elements and measuring device, and detects the optical signal being output to the output waveguides of the AWG with the photodetection elements, and measures characteristics such as power with the measuring device.

Here, elements such as a photodiode that can convert an optical signal into an electrical signal may be used as the photodetection element, and the number of the photodetection element is configured to correspond to the number of the optical signals configuring the first signal and the second signal.

That is, when the first signal is a signal where optical signals of 1270 nm, 1310 nm and 1610 m wavelengths are mixed, and the second signal is a signal where optical signals of 1490 nm, 1550 nm and 1580 nm (or 1577 nm or 1578 nm) wavelengths are mixed, the detection part 50 is configured of 6 photodetection elements.

In addition, as in Table 2 below, the photodetection elements are connected to only the output waveguides where the optical signals of wavelengths configuring the first signal and the second signal are output, to form detection channels, and the photodetection elements are not connected to other output waveguides.

TABLE 2

| Output waveguides | Center wavelength of output optical signal | Detection part |
|---|---|---|
| OUT No. 1 | 1270 nm | CH1 |
| OUT No. 2 | 1310 nm | CH2 |
| OUT No. 3 | 1340 nm | |
| OUT No, 4 | 1370 nm | |
| OUT No. 5 | 1400 nm | |
| OUT No. 6 | 1430 nm | |
| OUT No. 7 | 1460 nm | |
| OUT No. 8 | 1490 nm | CH4 |
| OUT No. 9 | 1520 nm | |
| OUT No. 10 | 1550 nm | CH5 |
| OUT No. 11 | 1580 nm | CH6 |
| OUT No. 12 | 1610 nm | CH3 |

The output part 60 outputs information of a signal detected by the detection part 50.

The information output by the output part may include the type of the detected signal (for example, the first signal (ONT signal), the second signal (OLT signal)), wavelength, power and the like.

As described above, since the detection part 50 is configured such that the photodetection elements are connected to only the output waveguides where the optical signals of wavelengths configuring the first signal and the second signal are output, the output part 60 can determine whether the detected optical signal is the first signal or the second signal, and of which wavelength the optical signal is, depending on from which channel the optical signal is detected.

That is, when configured as in Table 2, even if there is no other information, it can be known that when the optical signal is detected from CH1, that optical signal is the optical signal of 1270 nm wavelength of the first signal, and when the optical signal is detected from CH2, that optical signal is the optical signal of 1310 nm wavelength of the first signal, and when the optical signal is detected from CH3, that optical signal is the optical signal of 1610 nm wavelength of the first signal, and when the optical signal is detected from CH4, that optical signal is the optical signal of 1490 nm wavelength of the second signal, and when the optical signal is detected from CH5, that optical signal is the optical signal of 1550 nm wavelength of the second signal, and when the optical signal is detected from CH6, that optical signal is the optical signal of 1580 nm wavelength of the second signal.

The aforementioned PON power meter using multi input type AWG according to an embodiment of the present disclosure 100 does not need (S+P) filters in order to separately measure the first signal where signals of S wavelengths are mixed and the second signal where signals of P wavelengths are mixed, unlike conventional power meters.

Instead, the PON power meter using multi input type AWG according to an embodiment of the present disclosure is capable of separating signals of (S+P) wavelengths respectively using one 2×1 coupler and one 1×M AWG, and of measuring power, and thus has advantages of simple configuration, good portability, and high efficiency.

Figure 3:
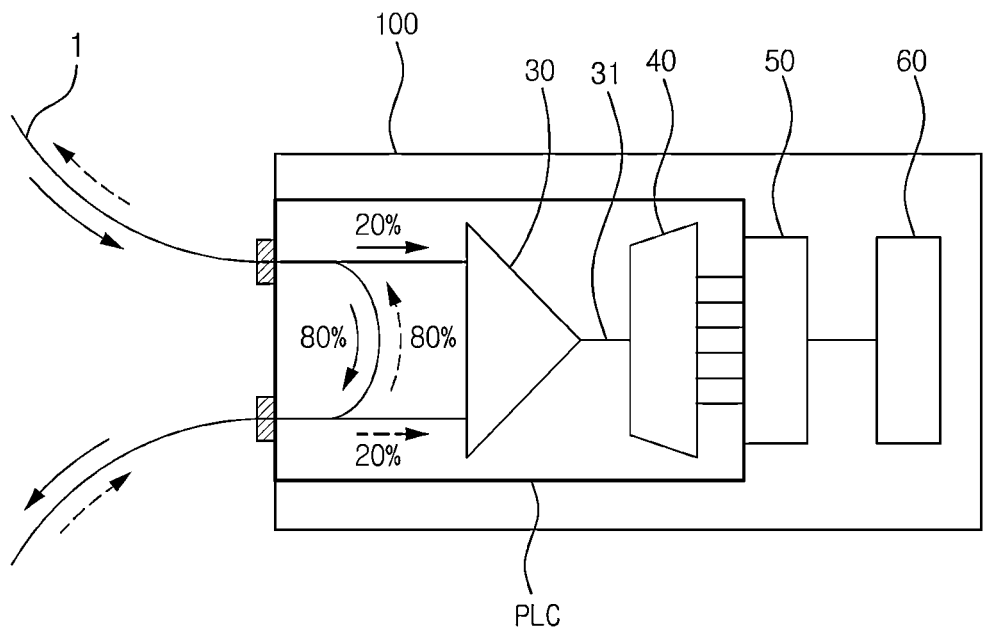
FIG. 3 is a schematic view showing an input part, a coupler, and an AWG configured in one PLC chip in the PON power meter using multi input type AWG according to an embodiment of the present disclosure.

In addition, in the PON power meter using multi input type AWG according to an embodiment of the present disclosure 100, as illustrated in FIG. 3, the first input part, the second input part, the coupler 30, and the AWG 40 may be embodied in one Planar Lightwave Circuit (PLC) chip.

In this case, all the optical paths required for the PON power meter using multi input type AWG according to an embodiment of the present disclosure are formed in one PLC chip. Therefore, components of the power meter become simplified, and there is no need to assemble components between optical fibers.

Further, since only the photodetection elements need to be connected to the output waveguides of the AWG, assembly becomes convenient, and productivity may be improved.

Further, as illustrated in FIG. 3, an optical path may be formed in the PLC such that only a portion of the optical signal input from the optical cable is input into the AWG 40 through the coupler 30.

That is, as illustrated in FIG. 3, in the PLC chip, an optical path may be formed, that inputs a portion of the optical signal transmitted from one side to the other side of the optical cable into the AWG and outputs the rest to the other side of the optical cable, and that inputs a portion of the optical signal transmitted from the other side to the one side of the optical cable into the AWG and that outputs the rest to the one side of the optical cable.

The first input part and the second input part can play the role of an optical splitter through such an optical path, and thus the multi input type PON power meter according to an embodiment of the present disclosure can be connected to the optical cable if only a connector is attached to an input terminal, and can transmit a portion of the signal transmitted through the connected optical cable to the AWG to measure the power of the optical signal. Therefore, components of the power meter can be simplified, and productivity and lightweightness of the components can be improved.

Figure 4:
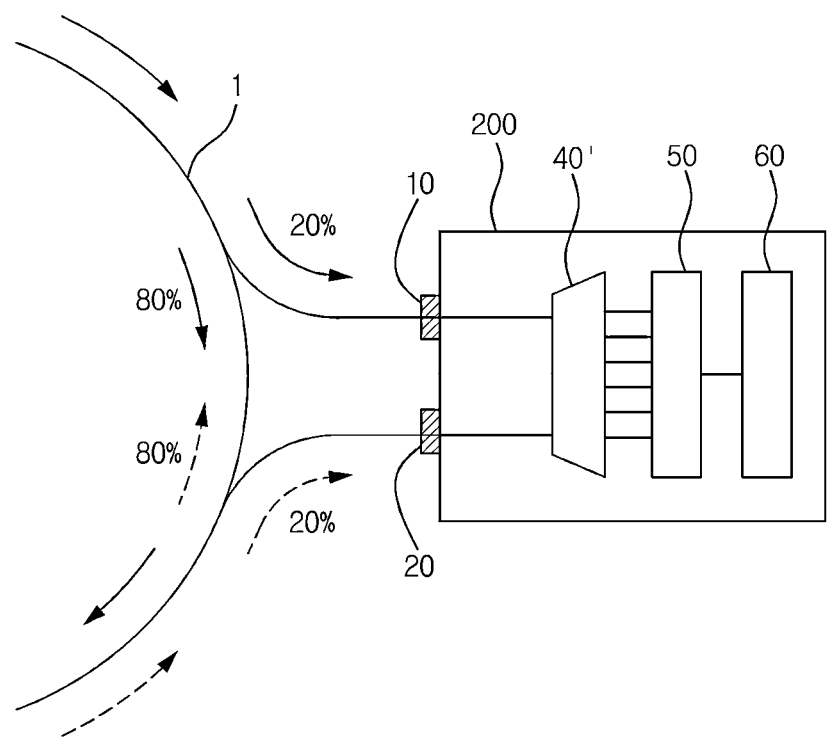
FIG. 4 is a schematic view of the PON power meter using multi input type AWG according to another embodiment of the present disclosure.

FIG. 4 illustrates a schematic view of the PON power meter using multi input type AWG according to another embodiment of the present disclosure 200.

The PON power meter using multi input type AWG according to another embodiment of the present disclosure 200 includes a first input part 10, a second input part 20, an AWG 40', a detection part 50 and an output part 60.

The PON power meter using multi input type AWG according to another embodiment of the present disclosure 200 illustrated in FIG. 4 does not include a coupler 30 unlike the PON power meter using multi input type AWG according to an embodiment of the present disclosure 100, and is characterized in that the first signal and the second signal are directly input into the AWG 40' from the first input part 10 and the second input part 20.

The aforementioned PON power meter using multi input type AWG according to another embodiment of the present disclosure 200 requires one less component compared to the PON power meter using multi input type AWG according to the embodiment of the present disclosure 100, and the optical signal is directly input into the AWG 40' without going through the coupler, and thus optical loss can be reduced.

Figure 5:
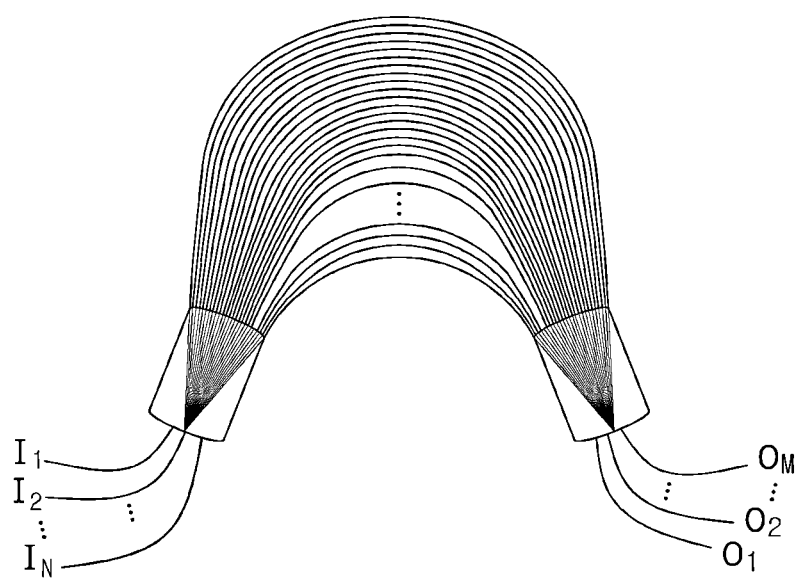
FIG. 5 is a view showing N×M AWG used in the PON power meter using multi input type AWG according to another embodiment of the present disclosure.

For this purpose, as illustrated in FIG. 5, the PON power meter using multi input type AWG according to another embodiment of the present disclosure 200 includes N×M AWG 40' having a plurality of input waveguides and a plurality of output waveguides, and each of the first input part 10 and the second input part 20 is connected to one of the N input waveguides of N×M AWG 40'.

Here, if the first signal input through the first input part is a signal where optical signals of S wavelengths are mixed, and the second signal input through the second input part is a signal where optical signals of P wavelengths are mixed, N is an integer greater than or equal to 2, and M is an integer greater than or equal to (S+P).

Figure 6:
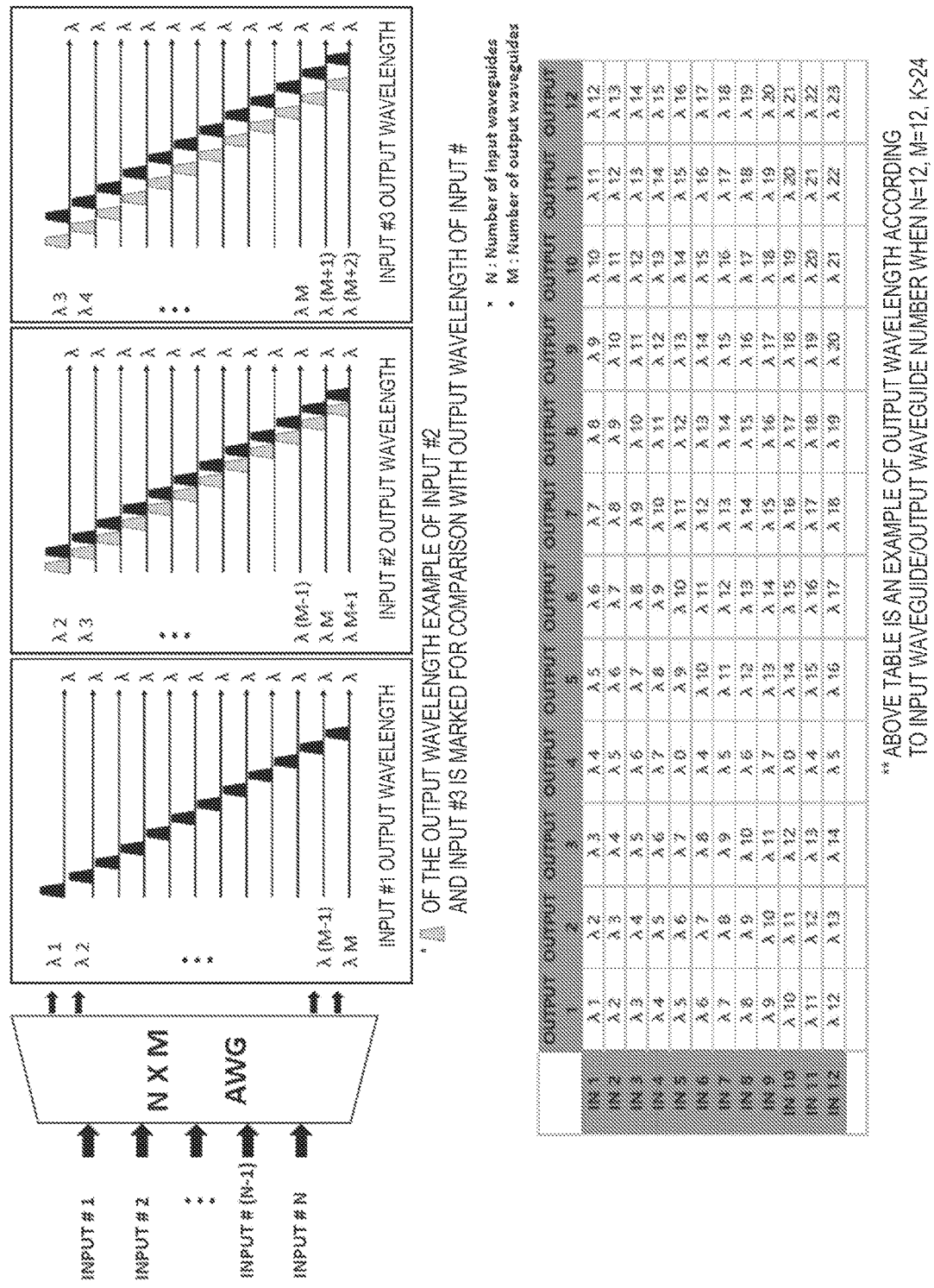
FIG. 6 is a view showing output wavelength changes according to input waveguides of N×M AWG in the case of K≥N+M.
Figure 7:
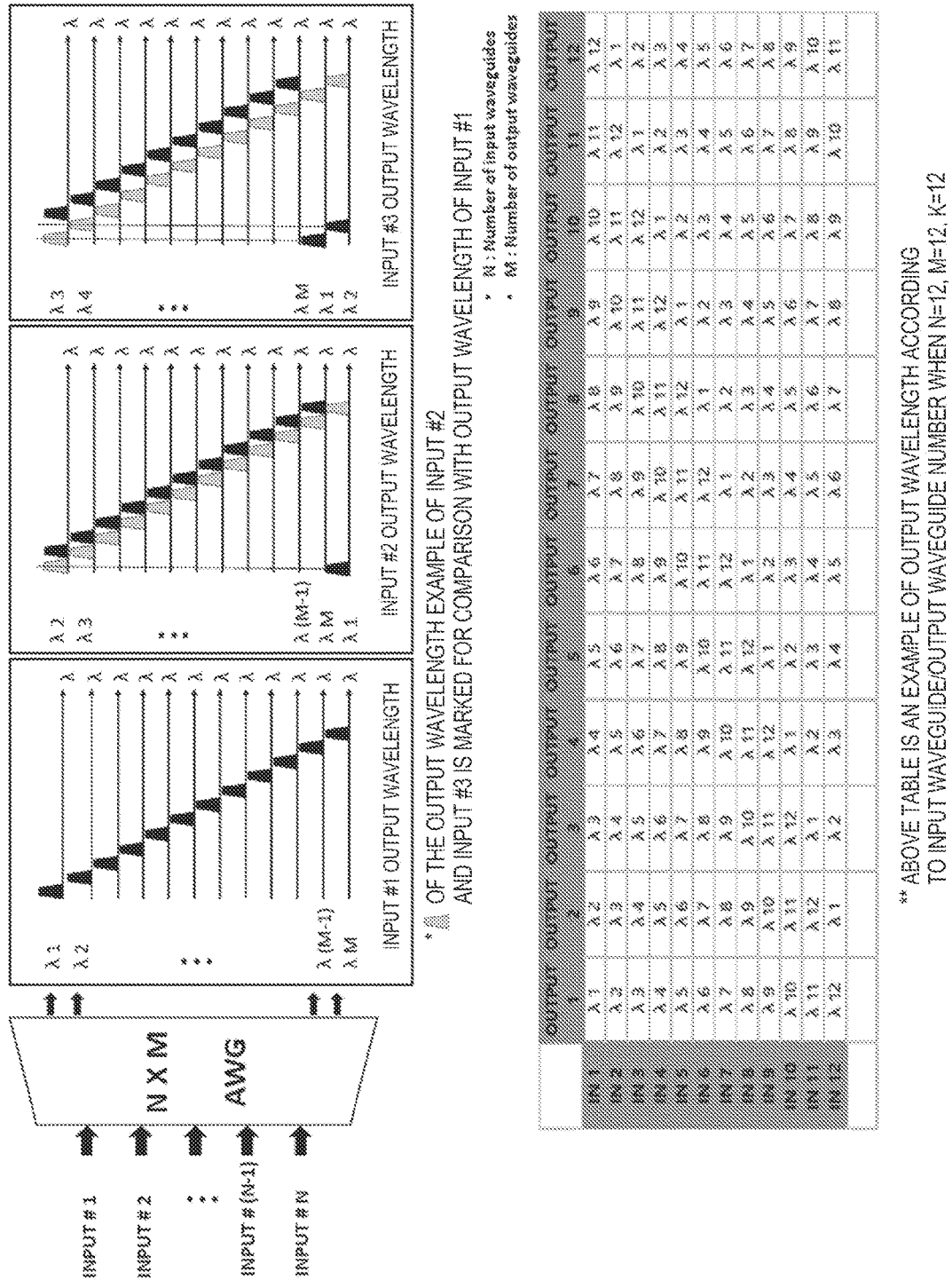
FIG. 7 is a view showing output wavelength changes according to input waveguides of N×M AWG in the case of K=M.

More specifically, the optical signals being output to each output waveguide according to the input waveguide in N×M AWG 40' are as illustrated in FIGS. 6 and 7.

FIG. 6 is when the number of available wavelength channels K corresponding to the FSR of the AWG is greater than or equal to the sum of the number of input waveguides and the number of output waveguides N+M, and FIG. 7 is when the number of available wavelength channels K is the same as the number of output waveguides.

Here, in N×M AWG 40', the optical signal input into one input waveguide is divided into M output waveguides and output according to wavelengths, and the optical signals output to output waveguides neighboring each other have a certain wavelength difference of $\Delta\lambda+\alpha$ ($0\leq\alpha\leq\Delta\lambda/3$).

In addition, in the N×M AWG 40', when the same optical signal is input into different input waveguides, even though they are the same optical signal, due to the difference of optical paths, there is a wavelength difference of $L\times\Delta\lambda$ (L is a natural number) between the optical signals output to the same output wavelength.

When the wavelength difference of the optical signals configuring the first signal and the second signal is $L\times\Delta\lambda+\alpha$ (L is an integer, $0\leq\alpha\leq\Delta\lambda/3$), it is desirable that the wavelength difference between the optical signals being output to the output waveguides neighboring each other is $\Delta\lambda+\alpha$, and $0\leq\alpha\leq\Delta\lambda/3$.

$\Delta\lambda$ may be equal to or smaller than the minimum wavelength difference between the optical signals configuring the first signal and the second signal.

In such a N×M AWG 40', the input waveguides are selected such that the optical signals of S wavelengths configuring the first signal and the optical signals of P wavelengths configuring the second signal are output to output waveguides that are different from each other, and connected to the first input part and the second input part, respectively. In addition, the photodetection element of the detection part 50 is connected to only the output waveguides from which the optical signals corresponding to the wavelengths of (S+P) optical signals configuring the first signal and the second signal are output respectively. Then, the power of a two-way signal where a plurality of optical signals are mixed can be detected with only one AWG without a 2×1 coupler.

The power meter according to another embodiment of the present disclosure 200 may be described in detail once again as below taking the first signal where the optical signal of 1270 nm, 1310 nm, and 1610 nm wavelengths are mixed and the second signal where the optical signal of 1490 nm, 1550 nm, and 1580 nm (or 1577 nm or 1578 nm) wavelengths are mixed, as an example.

First of all, in order to divide the optical signal of 6 wavelengths configuring the first signal and the second signal using one AWG, N×M AWG 40' may be configured as in Table 3 below. Here, the first input part 10 may be connected to input waveguide 1 (INPUT 1), and the second input part 20 may be connected to the input waveguide 2 (INPUT 2), and the photodetection element may be connected to 6 output waveguides from which each wavelength is being output, to form a detection channel.

TABLE 3

| Output waveguide | INPUT 1 | INPUT 2 | Detection part |
|---|---|---|---|
| OUT No. 1 | 1270 nm | 1300 nm | CH1 |
| OUT No. 2 | 1310 nm | 1340 nm | CH2 |
| OUT No. 3 | 1340 nm | 1370 nm | |
| OUT No. 4 | 1370 nm | 1400 nm | |
| OUT No. 5 | 1400 nm | 1430 nm | |
| OUT No. 6 | 1430 nm | 1460 nm | |

TABLE 3-continued

| Output waveguide | INPUT 1 | INPUT 2 | Detection part |
|---|---|---|---|
| OUT No. 7 | 1460 nm | 1490 nm | CH4 |
| OUT No. 8 | 1490 nm | 1520 nm | |
| OUT No. 9 | 1520 nm | 1550 nm | CH5 |
| OUT No, 10 | 1550 nm | 1580 nm | CH6 |
| OUT No. 11 | 1580 nm | 1610 nm | |
| OUT No. 12 | 1610 nm | 1640 nm | CH3 |

Otherwise, in order to divide the optical signal of 6 wavelengths configuring the first signal and the second signal using one AWG, N×M AWG 40' may be configured as in Table 4 below. Here, the first input part 10 may be connected to input waveguide 1 (INPUT 1), and the second part 20 may be connected to input waveguide 3 (INPUT 3), and the photodetection element may be connected to the 6 output waveguides from which each wavelength is being output, to form a detection channel.

TABLE 4

| Output waveguide | INPUT 1 | INPUT 2 | INPUT 3 | Detection part |
|---|---|---|---|---|
| OUT No. 1 | 1270 nm | 1300 nm | 1330 nm | CH1 |
| OUT No. 2 | 1310 nm | 1340 nm | 1370 nm | CH2 |
| OUT No. 3 | 1340 nm | 1370 nm | 1400 nm | |
| OUT No. 4 | 1370 nm | 1400 nm | 1430 nm | |
| OUT No. 5 | 1400 nm | 1430 nm | 1460 nm | |
| OUT No. 6 | 1430 nm | 1460 nm | 1490 nm | CH4 |
| OUT No. 7 | 1460 nm | 1490 nm | 1520 nm | |
| OUT No. 8 | 1490 nm | 1520 nm | 1550 nm | CH5 |
| OUT No. 9 | 1520 nm | 1550 nm | 1580 nm | CH6 |
| OUT No. 10 | 1550 nm | 1580 nm | 1610 nm | |
| OUT No. 11 | 1580 nm | 1610 nm | 1640 nm | |
| OUT No. 12 | 1610 nm | 1640 nm | 1670 nm | CH3 |

Otherwise, in order to divide the optical signal of 6 wavelengths configuring the first signal and the second signal using one AWG, N×M AWG 40' may be configured as in Table 5 below. Here, the first input part 10 may be connected to input waveguide 1 (INPUT 1), and the second input part 20 may be connected to input waveguide 4 (INPUT 4), and the photodetection element may be connected to 6 output waveguides from which each wavelength is being output, to form a detection channel.

TABLE 5

| Output waveguide | INPUT 1 | INPUT 2 | INPUT 3 | INPUT 4 | Detection part |
|---|---|---|---|---|---|
| OUT No. 1 | 1270 nm | 1300 nm | 1330 nm | 1360 nm | CH1 |
| OUT No. 2 | 1310 nm | 1340 nm | 1370 nm | 1400 nm | CH2 |
| OUT No. 3 | 1340 nm | 1370 nm | 1400 nm | 1430 nm | |
| OUT No. 4 | 1370 nm | 1400 nm | 1430 nm | 1460 nm | |
| OUT No. 5 | 1400 nm | 1430 nm | 1460 nm | 1490 nm | CH4 |
| OUT No. 6 | 1430 nm | 1460 nm | 1490 nm | 1520 nm | |
| OUT No. 7 | 1460 nm | 1490 nm | 1520 nm | 1550 nm | CH5 |
| OUT No. 8 | 1490 nm | 1520 nm | 1550 nm | 1580 nm | CH6 |
| OUT No. 9 | 1520 nm | 1550 nm | 1580 nm | 1610 nm | |
| OUT No. 10 | 1550 nm | 1580 nm | 1610 nm | 1640 nm | |
| OUT No. 11 | 1580 nm | 1610 nm | 1640 nm | 1670 nm | |
| OUT No. 12 | 1610 nm | 1640 nm | 1670 nm | 1700 nm | CH3 |

As such, in the PON power meter using multi input part AWG according to another embodiment of the present disclosure 200, the AWG is configured such that the first signal and the second signal are input into the input waveguides that are different from each other, and thus a 2×1 coupler for inputting the first signal and the second signal into one input waveguide is not required.

In addition, since the detection part 50 is configured to connect the photodetection element to only the output waveguides from which the optical signal of the wavelengths configuring the first signal and the second signal are output, the output part 60 may determine whether the detected optical signal is the first signal or the second signal, and of which wavelength the optical signal is, depending on from which channel the optical signal is detected.

That is, when configured as in Tables 3 to 5, even without other information, it can be known that when the optical signal is detected from CH1, that optical signal is a 1270 nm wavelength optical signal of the first signal, when the optical signal is detected from CH2, that optical signal is a 1310 nm wavelength optical signal of the first signal, and when the optical signal is detected from CH3, that optical signal is a 1610 nm wavelength optical signal of the first signal, and when the optical signal is detected from CH4, that optical signal is a 1490 nm wavelength optical signal of the second signal, and when the optical signal is detected from CH5, that optical signal is a 1550 nm wavelength optical signal of the second signal, and when the optical signal is detected from CH6, that optical signal is a 1580 nm wavelength optical signal of the second signal.

Figure 8:
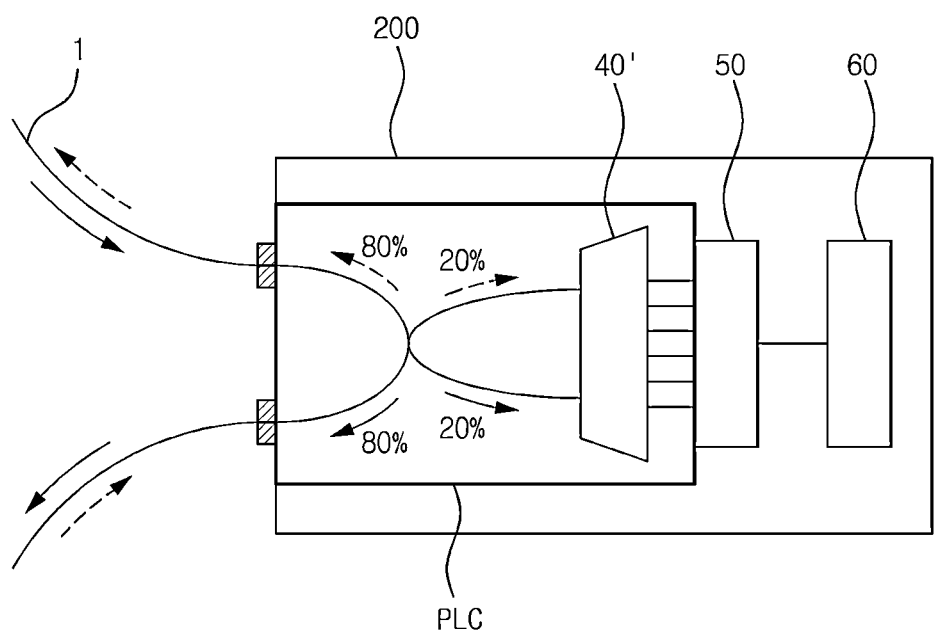
FIG. 8 is a schematic view showing an input part and an AWG configured in on PLC chip in the PON power meter using multi input type AWG according to another embodiment of the present disclosure.

In addition, just as in the PON power meter using multi input type AWG according to the embodiment of the present disclosure 100, the PON power meter using multi input type AWG according to another embodiment of the present disclosure 200 may also embody the first input part, the second input part and the AWG 40' in one Planar Lightwave Circuit (PLC) chip as illustrated in FIG. 8.

In this case, all the optical paths required for the PON power meter using multi input type AWG are formed in one PLC chip. Therefore, components of the power meter become simplified, and there is no need to assemble between the optical fibers.

Further, since only the photodetection element needs to be connected to the output waveguide of the AWG, assembly is convenient, thus improving productivity.

In addition, as illustrated in FIG. 8, the optical path may be formed in the PLC such that a portion of the optical signal input from the optical cable is input into the AWG 40.

That is, as illustrated in FIG. 8, in the PLC chip, an optical path may be formed, that inputs a portion of the optical signal transmitted from one side to the other side of the optical cable into the AWG and outputs the rest to the other side of the optical cable, and that inputs a portion of the optical signal transmitted from the other side to the one side of the optical cable into the AWG and that outputs the rest to the one side of the optical cable.

Through such an optical path, the first input part and the second input part can play the functions of an optical splitter, and thus the PON power meter using multi input type AWG according to an embodiment of the present disclosure may be connected to an optical cable as long as a connector is attached to the input terminal, and a portion of the signal being transmitted through the connected optical cable may be transmitted to the AWG to measure the power of the optical signal. Therefore, components of the power meter can be simplified, and the productivity and lightweightness of the components can be improved. Hereinabove, the PON power meter using multi input type AWG according to an embodiment of the present disclosure was described limitatively with reference to specific embodiments. However, it should be understood that the present disclosure is not limited to such specific embodiments, and that various changes and alterations can be made without departing from the spirit and field of the present disclosure claimed in the claims set.

REFERENCE NUMERALS

1: Optical Cable
10: First Input Part
20: Second Input Part
30: Coupler
40, 40': AWG
50: Detection Part
60: Output Part

What is claimed is:

1. A PON power meter using multi input type AWG, comprising:
    a first input part into which a first signal is input, wherein the first signal has S optical signals whose wavelengths are different from each other;
    a second input part into which a second signal is input, wherein the second signal has P optical signals whose wavelengths are different from each other;
    a coupler that receives the first signal and the second signal from the first input part and the second input part and outputs the received first signal and second signal through one output line;
    an AWG that distributes the signal output from the output line of the coupler to M output waveguides according to wavelength band;
    a detection part configuring (S+P) detection channels by connecting a photodetection element to only (S+P) output waveguides of the M output waveguides of the AWG, wherein each of the (S+P) output waveguides outputs an optical signal whose wavelength corresponds to one of the wavelengths of the S optical signals and the P optical signals; and
    an output part that outputs a strength of the signal detected by the detection part,
    wherein the AWG is a 1×M AWG, S and P are integers, (S+P) is an integer that is greater than or equal to 3, M is an integer that is greater than or equal to (S+P), and the S optical signals and the P optical signals are output to different output waveguides in the AWG.

2. The PON power meter using multi input type AWG according to claim 1,
    wherein the output part determines whether the signal detected from the detection part is the first signal or the second signal and a wave length of the detected signal according to which channel of (S+P) detection channels the detected signal is detected.

3. The PON power meter using multi input type AWG according to claim 1,
    wherein the first input part and the second input part inputs only a portion of the signal transmitted through an optical cable into the power meter.

4. The PON power meter using multi input type AWG according to claim 1,
    wherein a wavelength difference between the optical signals output through the output waveguides neighboring each other of the AWG is $\Delta\lambda+\alpha$, and $0 \leq \alpha \leq \Delta\lambda/3$.

5. The PON power meter using multi input type AWG according to claim 4,
    wherein $\Delta\lambda$ is equal to or smaller than a minimum wavelength difference between optical signals configuring the first signal and the second signal.

6. The PON power meter using multi input type AWG according to claim 5, wherein the wavelength difference between the optical signals configuring the first signal and the second signal is $L \times \Delta\lambda + \alpha$, and L is a natural number.

7. The PON power meter using multi input type AWG according to claim 1,
wherein the first signal is a signal where an optical signal of 1270 nm, 1310 nm, and 1610 nm wavelengths are mixed, and the second signal is a signal where an optical signal of 1490 nm, 1550 nm, and 1577 nm to 1580 nm wavelengths are mixed, and
the M is greater than or equal to 12, and the detection part connects a photodetection element to only 6 of the output waveguides of the AWG to configure 6 detection channels.

8. The PON power meter using multi input type AWG according to claim 1,
wherein the first input part, second input part, coupler, and AWG are formed in one PLC chip.

9. The PON power meter using multi input type AWG according to claim 8,
wherein in the PLC chip, an optical path is formed, that inputs a portion of an optical signal transmitted from one side to the other side of an optical cable into the AWG, and outputs the rest to the other side of the optical cable, and inputs a portion of the optical signal transmitted from the other side to one side of the optical cable to the AWG, and outputs the rest to one side of the optical cable.

10. A PON power meter using multi input type AWG, comprising:
a first input part into which a first signal is input, wherein the first signal has S optical signals whose wavelengths are different from each other;
a second input part into which a second signal is input, wherein the second signal has P optical signals whose wavelengths are different from each other;
an AWG connected to the first input part and the second input part such that a signal from the first input part and a signal from the second input part are input into different input waveguides, respectively, and that distributes the input signal to M output waveguides according to wavelength band;
a detection part configuring (S+P) detection channels by connecting a photodetection element to only (S+P) output waveguides of the M output waveguides of the AWG, wherein each of the (S+P) output waveguides outputs an optical signal whose wavelength corresponds to the wavelength of the S optical signals and the P optical signals; and
an output part that outputs a strength of the signal detected by the detection part,
wherein the AWG is an N×M AWG, S and P are integers, (S+P) is an integer that is greater than or equal to 3, N is an integer that is greater than or equal to 2, M is an integer that is greater than or equal to (S+P), and the S optical signals and the P optical signals are output to different output waveguides in the AWG.

11. The PON power meter using multi input type AWG according to claim 10,
wherein the output part determines whether the signal detected from the detection part is the first signal or the second signal and a wave length of the detected signal according to which channel of (S+P) detection channels the detected signal is detected.

12. The PON power meter using multi input type AWG according to claim 10,
wherein the first input part and the second input part inputs only a portion of the signal transmitted through an optical cable into the power meter.

13. The PON power meter using multi input type AWG according to claim 10,
wherein a wavelength difference between the optical signals output through the output waveguides neighboring each other of the AWG is $\Delta\lambda + \alpha$, and $0 \leq \alpha \leq \Delta\lambda/3$.

14. The PON power meter using multi input type AWG according to claim 13,
wherein $\Delta\lambda$ is equal to or smaller than a minimum wavelength difference between optical signals configuring the first signal and the second signal.

15. The PON power meter using multi input type AWG according to claim 14,
wherein the wavelength difference between the optical signals configuring the first signal and the second signal is $L \times \Delta\lambda + \alpha$, and L is a natural number.

16. The PON power meter using multi input type AWG according to claim 10,
wherein the first signal is a signal where an optical signal of 1270 nm, 1310 nm, and 1610 nm wavelengths are mixed, and the second signal is an optical signal where an optical signal of 1490 nm, 1550 nm, and 1577 nm to 1580 nm wavelengths are mixed,
the N is 2 to 6, and M is greater than or equal to 12, and the detection part connects a photodetection element to only 6 of the output waveguides of the AWG to configure 6 detection channels.

17. The PON power meter using multi input type AWG according to claim 10,
wherein the first input part, second input part, and AWG are formed in one PLC chip.

18. The PON power meter using multi input type AWG according to claim 17,
wherein in the PLC chip, an optical path is formed, that inputs a portion of an optical signal transmitted from one side to the other side of an optical cable into the AWG, and outputs the rest to the other side of the optical cable, and inputs a portion of the optical signal transmitted from the other side to one side of the optical cable to the AWG, and outputs the rest to one side of the optical cable.

* * * * *